Patented Aug. 14, 1951

2,563,815

UNITED STATES PATENT OFFICE 2,563,815

PRODUCTION AND SEPARATION OF A PENTACHLOROPHENOL

Everett A. Bruce, Paoli, Pa., assignor to The Pennsylvania Salt Manufacturing Company, Philadelphia, Pa., a corporation of Pennsylvania No Drawing. Application February 21, 1948, Serial No. 10,200

7 Claims. (Cl. 260—623)

1

This invention relates to production of pentachlorophenol and salts thereof, and particularly to a unique purification step whereby a high quality pentachlorophenol may be produced by a process that has heretofore given only a low quality technical material.

It has long been known that pentachlorophenol may be prepared by hydrolysis of hexachlorobenzene whereby one of the chlorine atoms is replaced by a hydroxyl group (or a corresponding metal-oxy group). U. S. Patent 2,107,650, for example, describes both an older process and a newer variant of this process for thus hydrolyzing hexachlorobenzene to pentachlorophenol by digesting the hexachlorobenzene with an alcoholic solution of caustic soda. However, byproducts are formed in this hydrolysis reaction and it has not heretofore been possible to recover a high quality pentachlorophenol from the hydrolysis reaction product. The patentee of Patent 2,107,650, it is true, purports to produce pentachlorophenol to the "practical" exclusion of other phenolic products but in his specific example he describes his pentachlorophenol product as melting through the range 159 to 178° C. and as containing 65.55% chlorine. Pure pentachlorophenol contains about 66.7% chlorine, and it may be calculated that a product containing 65.55% chlorine could be made up of as little as 80% pentachlorophenol and as much as 20% tetrachlorophenols (the principal impurity in pentachlorophenol). From this and the indicated melting point, it will be clear that the pentachlorophenol product produced by the process of this patent is not a high quality product.

Pure pentachlorophenol has a melting point of about 191° C. and purchasers of this chemical have come to demand a product having a setting point of at least about 175° C., preferably 178° C. or above. Because of this demand the simple process of making pentachlorophenol by hydrolysis of hexachlorobenzene has been virtually abandoned so far as commercial practice is concerned and manufacturers have resorted to the alternative process of direct chlorination of phenol.

I have now discovered that a high quality pentachlorophenol, i. e. product of setting point at least 175° C. and usually about 178 to 185° C., may be obtained by a simple procedure involving the hydrolysis of hexachlorobenzene as its first step, by interposing a unique purification step at an intermediate point in the process as hereinafter described.

To apply the purification step of my invention, the reaction product of the hexachlorobenzene hydrolysis is obtained in the form of its sodium salt or other alkali metal salt, preferably dissolved in water. This material is then mixed with a brine or salt, or both, to form a solution, saturated or concentrated with respect to sodium chloride. The concentration of the inorganic salt in the mixture should be at least 50% of saturation and is preferably substantially at the point of saturation. The pH of the solution should be maintained on the alkaline side, preferably within the range of about 8 to 13.

I have discovered that under the conditions above described the pure salt of pentachlorophenol is relatively insoluble in the liquid (e. g., as little as 10% may be soluble) whereas closely related by-products of the hexachlorobenzene hydrolysis, for example, the salt of tetrachlorophenol, are substantially soluble in the liquid. Therefore, impurities formed as by-products in the hydrolysis may be eliminated to any desired degree from the pentachlorophenate salt by filtering this mixture, as shown in examples which follow.

The pentachlorophenol eventually recovered by redissolving and acidifying this purified pentachlorophenate generally has a setting point of 178° C. or above and may have a setting point as high as 185° C. or above, whereas the pentachlorophenol obtained by the same acidification of the hydrolysis reaction product may have a setting point as low as 157° C.

My unique purification procedure is not to be confused with the salting out procedure commonly employed to precipitate organic materials since in my process there is a selective precipitation of the salts from their solution; in the previous art no such selectivity has been suggested.

In a preferred method of carrying out the process of my invention, the reaction product of hydrolysis of hexachlorobenzene (produced for example by digesting the hexachlorobenzene with a caustic soda solution at an elevated temperature) may first be taken up with the minimum amount of water needed to dissolve the water soluble portion of this reaction product, caustic alkali being employed (if it was not employed for the hydrolysis) to convert the phenolic reaction product into salt form. The resulting solution may be clarified by filtering if desired but this is not usually necessary when alcoholic caustic soda was employed for the hydrolysis. This solution is then mixed with at least an equal volume preferably, and most advantageously with two or three times its volume of brine, and additional sodium chloride if desired, so that the aqueous phase of the resulting mixture ranges from 50% saturation to complete saturation with sodium chloride. Substantially complete saturation with sodium chloride is preferred.

Employing an equal volume of brine for the above step, 85% of the hydrolysis reaction product may eventually be recovered as a pentachlorophenol of setting point 175–176° C., whereas employing three volumes brine to one of hydrolysis reaction product solution, 80 to 85% of the hydrolysis reaction product is recovered as a pentachlorophenol of 178 to 179° C. setting point. As to salt concentration, by employing two volumes of brine containing sufficient salt to make the resulting solution ⅔ saturated, about 75% of the hydrolysis reaction product may eventually be recovered as a pentachlorophenol of setting point above 180° C., whereas if the solution is completely saturated with NaCl under these conditions, a somewhat higher yield (80 to 85%) of material setting at 178° C. or above is obtained.

The pH of the solution is also an important variable in carrying out my purification step. The pH preferably ranges from around 8 to over 13; a pH in the range 11.5 to 12.5 is most advantageous. A low pH such as 8.4 gives a relatively low yield of pentachlorophenol of extremely high setting point, for example, 68% yield of a product of setting point 185° C., and when this extremely pure product is desired the lower pH should be employed.

While the temperature of operation is not critical in my process I have found that by employing a high temperature, e. g., around 80° C., rather than room temperature, a slightly lower yield of higher quality pentachlorophenol (setting point around 180 to 181° C.) may be obtained. It will be seen that a substantial raise in the setting point of the eventual pentachlorophenol product above 178 or 179° C. is generally obtained at the expense of yield, but this may be justified where the purer product is desired.

The mixture of brine and hydrolysis reaction product as above described, preferably after standing for some hours to be sure of reaching equilibrium, is filtered to separate the high quality sodium pentachlorophenate product which has precipitated. The filtrate may be acidified to cause separation as an oil of the impurities such as tetrachlorophenol as well as the small amount of pentachlorophenol whose sodium salt remained in solution. This by-product may find uses as a mixed chlorophenol.

The separated solid, sodium pentachlorophenate, may be dried and sold as such if its sodium chloride content is not objectionable. Or some separation may be made by suitable solvent extraction to produce a sodium pentachlorophenate product suitable for some purposes. Preferably, however, this solid is dissolved in water and the solution acidified, for example with technical muriatic acid, sulfuric acid, nitric acid, phosphoric acid or any relatively strong acid, as well known in the art of liberating phenols from salts thereof, whereupon the free pentachlorophenol precipitates. This material is then filtered off and dried. It is the pentachlorophenol recovered in this way that is referred to in the above discussions of setting point.

The brine filtrate referred to in the above described preferred procedure may be saved and reused where a sodium chloride solution of its concentration can be employed in the process.

The purity of the initial hexachlorobenzene seems to have no significant effect on the purity of the pentachlorophenol product obtainable by my process, although the yield of high quality pentachlorophenol from impure hexachlorobenzene may be slightly lower than the yield from pure hexachlorobenzene. Thus hexachlorobenzenes of purity ranging from 216° C. setting point to 225.8° C. setting point have all been found to give the high quality pentachlorophenol referred to in the above discussion, whereas if my new purification step is omitted, the pentachlorophenol obtained from these grades of hexachlorobenzene will range in setting point from 157° C. to 165° C.

When a very high quality sodium pentachlorophenate is the desired commercial product, this is best obtained by first making the high quality pentachlorophenol as above described, and then dissolving this material in caustic soda solution to convert the phenol to its sodium salt, which may then be recovered from the solution. Similarly any other desired salt may be made from the pentachlorophenol, e. g., the potassium, ammonium, calcium copper or other pentachlorophenate.

In the above-described step of selective precipitation of sodium pentachlorophenate by salting out, salts other than sodium chloride of suitable solubility may be used, e. g., sodium sulfate, sodium sulfite, and the corresponding potassium salts. The expression "inorganic salt having a water solubility at least as great as that of sodium chloride" as used in the claims is intended to include each of the above named salts as well as other salts of at least equivalent water solubility. Also, the phenates may be present as potassium or ammonium salts, instead of sodium, and the same selective salting out procedure followed. Usually an inorganic salt is employed of the same cation as the phenate, but this is not essential.

The following examples are illustrative of the process of my invention.

*Example 1*

107 lbs. of hexachlorobenzene of setting point 226.7° C., 181 lbs. of methyl alcohol and 45 lbs. of sodium hydroxide were charged to an autoclave and reacted under pressure at 250° F. for three hours. The methanol was then distilled off and 680 lbs. of water added to dissolve the sodium pentachlorophenate. 1650 lbs. of saturated NaCl solution and 248 lbs. of solid NaCl were added to the solution and the mixture at a pH of 11.5, stirred for two hours. The salted-out sodium pentachlorophenate was then filtered off on a rotary vacuum continuous filter, and the resultant filter cake dissolved in sufficient water to make a solution containing about 3.5% $C_6Cl_5ONa$. This solution was then acidified to a pH of 2 with muriatic acid, and allowed to stir until the $C_6Cl_5OH$ was completely crystallized. The solid $C_6Cl_5OH$ was then filtered from the solution on a rotary vacuum continuous filter, the wet cake dehydrated, and melted in a heated kettle, then flaked from a chilled roll. The brine fom the filtration of the sodium pentachlorophenate was acidified to a pH of 2, upon which oily phenolic materials were precipitated out and recovered.

*Example 2*

107 lbs. of hexachlorobenzene of setting point 225.8° C., 181 lbs. of methyl alcohol and 45 lbs.

of sodium hydroxide were charged to an autoclave and reacted under pressure at 250° F. for three hours. The methanol was then distilled off and 680 lbs. of water added to dissolve the sodium pentachlorophenate. The solution was clarified while hot by pumping through a filter press.

One volume of the resulting clarified solution of hydrolysis product was mixed with three volumes of water containing sufficient sodium chloride to give a concentration of 350 grams sodium chloride per liter of the entire resulting solution. This was accomplished by adding the hydrolysis mixture solution slowly to the brine with stirring. Both solutions were at a temperature of 25° C. and without further adjustment the pH of the resulting mixture was 12.1. The mixture was allowed to stand one hour with intermittent stirring while the sodium salt of the pentachlorophenol precipitated. The sodium salt was removed from the brine by filtration and dissolved in water. The resulting solution was filtered to remove a trace of a fluffy solid material. The clarified solution was acidified with technical muriatic acid until the pentachlorophenol was completely precipitated. After standing for one hour, the phenol was filtered off, and the cake washed with two liters of water. A sample of the resulting filter cake was dried by fusion in an open enamel cup and the setting point was determined immediately after fusion and also after the material had been held in the molten state for one hour.

The brine liquid that remained after the sodium salt was removed by filtration was acidified and allowed to stand overnight. The by-product oils which separated out of the liquid were washed and weighed.

About 85% of the hydrolysis reaction product was thus eventually recovered as a pentachlorophenol setting point 178–179° C.; after one hour the pentachlorophenol showed a setting point of 179° C. The pentachlorophenol made by exactly the same process, except for omission of my purification step, had a setting point of 164–5° C.

*Example 3*

Employing a procedure exactly as described in Example 2, except that an equal volume of water was added to the clarified hydrolysis mixture solution (the resulting mixture still contained 350 grams sodium chloride per liter of solution) about 83% of the hydrolysis reaction product was eventually recovered as a pentachlorophenol of 176° C. setting point.

*Example 4*

107 lbs. of hexachlorobenzene of setting point 216° C., 181 lbs. of methyl alcohol and 45 lbs. of sodium hydroxide were charged to an autoclave and reacted under pressure at 250° F. for three hours. The methanol was then distilled off and 680 lbs. of water added to dissolve the sodium pentachlorophenate. The solution was clarified while hot by pumping through a filter press.

The clarified hydrolysis mixture solution was then treated with water and sodium chloride exactly as described in Example 2. 80% of the hydrolysis reaction product was eventually recovered as a pentachlorophenol of setting point 178 to 178.5° C. measured both immediately and after standing an hour in the molten state. A pentachlorophenol made similarly but without the purification step had a setting point of 157° C.

*Example 5*

The process of Example 2 was repeated employing the same material and conditions except that the mixture of brine and clarified hydrolysis mixture solution was adjusted to a pH of 8.4 by addition of muriatic acid. About 67% of the hydrolysis reaction product was eventually recovered as a pentachlorophenol of setting point 185° C.

*Example 6*

The process of Example 2 was repeated employing the same materials and conditions except that the temperature was maintained at 80° C. during the brine treatment purification step. About 80% of the hydrolysis reaction product was eventually recovered as a pentachlorophenol of setting point 180 to 181° C.

*Example 7*

The process of Example 2 was repeated employing the same materials and conditions except that only 262 grams sodium chloride were present per liter of solution after addition of the brine (three-quarters saturated). About 76% of the hydrolysis reaction product was eventually recovered as a pentachlorophenol of setting point 181° C.

*Example 8*

Employing the same process, except that 2 volumes of water were added to one volume of hydrolysis product solution and the amount of sodium chloride in the final solution amounted to 233 grams per liter (two-thirds saturated), about a 75% yield of pentachlorophenol of setting point 181° C. was obtained.

Procedures may be carried out essentially as above described, varying a number of details as hereinbefore pointed out. Thus other hydrolysis methods for converting a chlorobenzene to a phenol, as indicated in the art, may be employed, and the selective salting out step may be carried out employing other equivalent inorganic salts and equivalent phenate salts, as earlier discussed.

The term "a pentachlorophenate" is used herein to include pentacholorphenol and its salts.

Since many modifications are possible in the process of my invention as above described without departing from the scope of my invention, it is intended that the above description of my invention should be interpreted as illustrative, and the invention is not to be limited except as set forth in the claims which follow.

I claim:

1. In the process for production of pentachlorophenol or its salts that involves hydrolysis of hexachlorobenzene, the improvement that comprises incorporating with the hydrolysis reaction product, in the form of its alkali metal salt, at least the volume of water needed to dissolve the water-soluble portion of this material, and adding a sufficient amount of inorganic salt having a water-solubility at least as great as that of sodium chloride to form a solution at least half saturated with respect to the inorganic salt, maintaining the pH of the resulting mixture on the alkaline side, and separating the high quality alkali metal pentachlorophenate that precipitates in this mixture.

2. In the process for production of a pentachlorophenate that involves hydrolysis of hexachlorobenzene, the improvement that comprises incorporating with the hydrolysis reaction product, in the form of its alkali metal salt, at least the volume of water needed to dissolve the water soluble portion of this material, and adding a sufficient amount of an inorganic salt having a water solubility at least as great as that of sodium chloride to form a solution at least half saturated with respect to the inorganic salt, maintaining the pH of the resulting mixture on the alkaline side, separating the high quality alkali metal pentachlorophenate that precipitates in this mixture, treating this alkali metal pentachlorophenate in aqueous solution with an acid to precipitate the corresponding phenol, and separating the precipitated phenol.

3. In the process for production of a pentachlorophenate that involves alkaline hydrolysis of hexachlorobenzene, the improvement that comprises incorporating with the hydrolysis reaction product, in the form of its sodium salt, at least twice the volume of water needed to dissolve the water soluble portion of this material, and adding sufficient of an inorganic salt having at least as great a water solubility as sodium chloride to form a solution at least two-thirds saturated with respect to the inorganic salt, maintaining the pH of the resulting mixture in the range of about 8 to about 13, and separating the high quality sodium pentachlorophenate that precipitates in this mixture.

4. In the process for production of a pentachlorophenate that involves alkaline hydrolysis of hexachlorobenzene, the improvement that comprises incorporating with the hydrolysis reaction product, in the form of its sodium salt, at least twice the volume of water needed to dissolve the water soluble portion of this material, and adding sufficient of an inorganic sodium salt having at least as great a water solubility as sodium chloride to form a solution at least two-thirds saturated with respect to the inorganic salt, maintaining the pH of the resulting mixture in the range of about 8 to about 13, and separating the high quality sodium pentachlorophenate that precipitates in this mixture, treating this sodium pentachlorophenate in aqueous solution with an acid to precipitate the corresponding phenol, and separating the precipitated phenol.

5. In the process for production of pentachlorophenol that involves hydrolysis of hexachlorobenzene by digesting it with caustic soda at an elevated temperature, the improvement that comprises incorporating with the hydrolysis reaction product, essentially free of organic solvent, at least about three times the volume of water needed to dissolve the water soluble portion of this material, and adding sufficient sodium chloride to form a solution approximately saturated with respect to sodium chloride, maintaining the pH of the resulting mixture in the range of about 11.5 to 12.5, separating the high quality sodium pentachlorophenate that precipitates in this mixture, treating this sodium pentachlorophenate in aqueous solution with an acid to precipitate the corresponding phenol, and separating the precipitated phenol.

6. In the process for production of a pentachlorophenate that involves alkaline hydrolysis of hexachlorobenzene, the improvement that comprises incorporating with a hydrolysis reaction product essentially free of organic solvent, in the form of its alkali salt, at least twice the volume of water needed to dissolve the water-soluble portion of this material, and adding sufficient of an inorganic alkali salt having at least the water solubility of sodium chloride to form a solution at least two-thirds saturated with respect to the inorganic salt, maintaining the pH in the resulting mixture in the range of about 8 to about 13, and separating the high quality alkali pentachlorophenate that precipitates in this mixture.

7. In the process for production of pentachlorophenol or its salts that involves hydrolysis of hexachlorobenzene, the improvement that comprises incorporating with the hydrolysis reaction product, in the form of its alkali metal salt, at least the volume of water needed to dissolve the water-soluble portion of this material, and adding sufficient sodium chloride to form a solution at least half saturated with respect to the inorganic salt, maintaining the pH of the resulting mixture on the alkaline side, and separating the alkali metal pentachlorophenate that precipitates in this mixture.

EVERETT A. BRUCE.

REFERENCES CITED

The following references are of record in the file of this patent:

UNITED STATES PATENTS

| Number | Name | Date |
|---|---|---|
| 2,107,650 | Smith et al. | Feb. 8, 1938 |

OTHER REFERENCES

Troitskii et al.: Chem. Abs., vol. 35, 3989 (1941).

Gatterman: Practical Methods of Organic Chemistry, 3rd ed., pub. by MacMillan, N. Y. (1923), pages 49, 50, 286, 287.